April 1, 1969  C. E. ERICKSON  3,436,166
GAS BURNER WITH CAPTURED SHUTTER
Filed Oct. 30, 1967
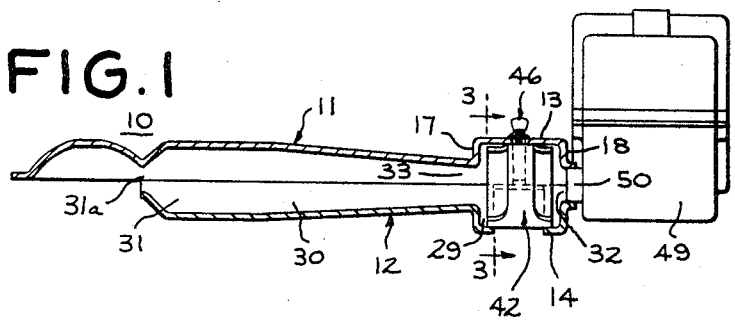
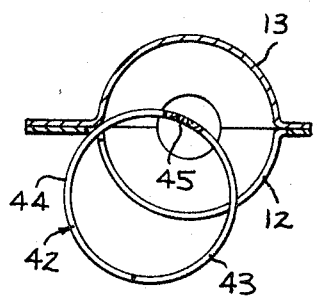
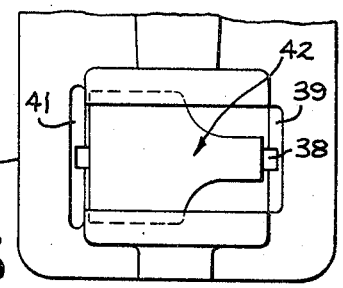
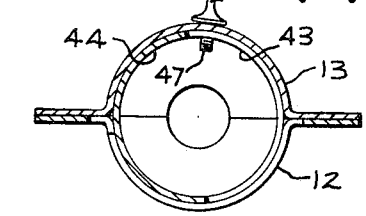
INVENTOR.
CLIFFORD E. ERICKSON
BY
HIS ATTORNEY

United States Patent Office 3,436,166
Patented Apr. 1, 1969

3,436,166
GAS BURNER WITH CAPTURED SHUTTER
Clifford E. Erickson, Chicago, Ill., assignor to General Electric Company, a corporation of New York
Filed Oct. 30, 1967, Ser. No. 679,049
Int. Cl. F23d *13/40;* F16k *13/00*
U.S. Cl. 431—354          7 Claims

ABSTRACT OF THE DISCLOSURE

A gas burner housing includes a mixing chamber having an air inlet. A shutter is inserted into the chamber through the burner wall after assembly of the housing and is movable within the chamber to vary the effective size of the air inlet.

Background of the invention

This invention relates to gas burners and, more particularly, to such burners which include a chamber for mixing the gas with a quantity of air prior to ignition. Often it is desirable to be able to vary the amount of air being mixed with the gas; therefore such burners normally are provided with an adjustable shutter for the mixing chamber air inlet. Prior art shutters have not been completely satisfactory. Many of them mount about the outside of the chamber, where they are subject to damage. Also in loosening the associated securing device there is the danger of getting the device too loose and having the shutter fall off. Other prior art shutters mount on the inside of the mixing chamber. Normally they have to be supported within the chamber area as the burner housing is assembled. This unduly complicates the manufacturing process.

An object of this invention is to provide a gas burner structure with an improved shutter arrangement.

Another object is to provide such an improved burner structure in which the shutter is captured within the mixing chamber.

A further object of this invention is to provide such an improved burner in which the shutter may be inserted into the mixing chamber after the burner housing is assembled.

Summary of the invention

In accordance with one embodiment of this invention there is provided a gas burner structure including a mixing chamber and a venturi tube. The mixing chamber has a smoothly curved peripheral wall defining an inlet at one end for gas and an outlet at the other end communicating with the venturi tube. The peripheral wall defines a circumferentially extending air opening therein and a slot at one end of the opening of greater width than the air opening. A complementally formed shutter, including a portion of greater width than the opening, is insertable in the mixing chamber by passing the greater width portion through the slot to bring the portion into at least partial register with the air opening, thereby to control the effective size of the air opening.

Brief description of the drawing

FIGURE 1 is a side elevational view, partly in section, of a gas burner constructed in accordance with one embodiment of this invention, and shown as being connected to a gas supply device.

FIGURE 2 is an exploded perspective view of the burner of FIGURE 1;

FIGURE 3 is a sectional view of the burner taken along lines 3—3 of FIGURE 1;

FIGURE 4 is a view similar to FIGURE 3, but showing the shutter in a partially inserted position; and FIGURE 5 is a fragmentary bottom view showing details of the mixing chamber and shutter portion of the burner of FIGURE 1.

Description of the preferred embodiments

Referring to the drawing, especially FIGURES 1 and 2, there is shown a gas burner 10 having a pair of elements 11 and 12, each of which comprises substantially one half of the burner housing. The elements 11 and 12 each has a semi-cylindrical section, 13 and 14 respectively, and a long, tapered groove of semi-circular cross-section, 15 and 16 respectively, extending axially from one end of the corresponding semi-cylindrical section. The semi-circular section 13 has spaced end walls 17 and 18 and semi-cylindrical section 14 has spaced end walls 19 and 20. The end walls 18 and 20 each has a semi-circular opening such as that shown at 21 and each of the end walls 17 and 19 has a semi-circular opening such as that shown at 22. The semi-circular openings in walls 17 and 19 communicate with the small radius end of the associated tapered grooves, 15 and 16. The other or large radius ends of the tapered grooves communicate with an expanded section, 23 and 24 respectively, each of which terminates in a semi-rectangular opening, such as that illustrated at 25.

Element 11 is provided with a domed extension 26 which projects axially from the expanded section 23. Each of the elements 11 and 12 is provided with a planar flange, 27 and 28 respectively. Flange 27 extends outwardly from the semi-cylindrical section 13, the tapered groove 15, the expanded section 23 and the domed extension 26 while flanges 28 extends outwardly from the semi-cylindrical section 14, the tapered groove 16 and the expanded section 24.

The burner housing is assembled by placing the elements 11 and 12 together so that the flanges 27 and 28 are in abutting relationship and then securing the flanges together by any suitable means such as spot welding or crimping the edge of one flange around the other. Thereafter, if desired, the assembly may be porcelain enameled. By assembling the elements in this manner the semi-cylindrical sections 13 and 14 are aligned to form a mixing chamber 29; the tapered grooves 15 and 16 are aligned to form a tube 30, which is commonly called a venturi tube in the art, and the expanded sections 23 and 24 are aligned to form a laminar flow region 31. The semi-circular openings in end walls 18 and 20 cooperate to form an inlet opening 32 for gas while the semi-circular openings in walls 17 and 19 cooperate to form an outlet 33 from the mixing chamber to the venturi tube; and the semi-rectangular openings, such as 25, mate to form a rectangular exit port 31a for the gas and air mixture. The domed extension 26 and its associated flange portion serve as a flame spreader to cause the flame emanating from the burner to be spread and flattened. Openings such as those indicated at 34, 35, 36 and 37 may be provided in the flanges 27 and 28 respectively to mate when the burner is assembled to provide a means both for mounting the burner in some structure such as a gas heated clothes dryer and to mount auxiliary elements such as igniters and flame detectors on the burner.

Referring now particularly to FIGURE 2 it will be seen that semi-cylindrical section 13 is provided with a relatively narrow, circumferentially disposed opening 38, which extends substantially completely across the peripheral wall of section 13 and may, in fact, extend slightly into the flange 27 on one side of the section 13 and stop just short of the flange on the other side. Section 14 is provided with a similar but relatively wide, circumferentially disposed opening 39 which extends substantially completely across the section 14 and may extend slightly into the flange 28 on one side, as indicated at 40. The other end of the opening 39 is provided with a slot 41 which is wider than the opening 39.

The openings 38 and 39 cooperate with a ring-like shutter 42 to provide an opening of predetermined, adjustable effective size to admit air to chamber 29 to be mixed with the gas. The shutter is complementally shaped with respect to the mixing chamber, in this embodiment being generally cylindrical in nature. The shutter includes a first relatively narrow portion 43 which extends substantially half way around the shutter 42 and a second, relatively wide portion 44 which also extends substantially half way around the shutter. The relatively narrow portion 43 is slightly wider than the narrow opening 38 but is substantially narrower than the opening 39 while the wide portion 44 is wider than the wide opening 39 but narrower than the slot 41. With this relationship of parts, the shutter 42 may be inserted within the mixing chamber 29, after the burner has been assembled, by passing the wide portion 44 through the slot 41. The shutter then is angularly adjustable within the mixing chamber in register with the openings 38 and 39. The widths of the narrow and wide portions 43 and 44 of the shutter are such that the shutter always will effectively close the opening 38; however, the opening 39 will be closed only to the extent that it is in register with the relatively wide portion 44. Thus, by rotating the shutter within the mixing chamber the effective size of the air inlet opening may be varied to control the amount of air mixed with the gas.

A threaded opening 45 is provided in the shutter adjacent one of the areas of juncture between the narrow portion 43 and the wide portion 44 to cooperate with a holding means such as thumb screw 46. The thumb screw 46 includes a threaded shaft 47 adapted to engage the threaded opening 45 and a flange 48 to engage the semi-cylindrical section 13 adjacent the opening 38. The shaft 47 may be inserted into the opening 45 a slight distance to provide a means for easily rotating the shutter within the mixing chamber. Then, after the shutter has been moved to the desired position, the thumb screw may be screwed down so that the flange 48 tightly engages the peripheral wall of the semi-cylindrical section 13 to releasably hold the shutter in that position.

With this arrangement the shutter may be rotated within the mixing chamber between one extreme position in which the opening 39 is substantially fully in register with wide portion 44 to be completely closed and another extreme position in which opening 39 is substantially fully out of register with wide portion 44 to be completely open. Since opening 38 terminates just short of flange 27; when the thumb screw and shutter are moved to their extreme position substantially completely exposing opening 39, the edge of wide portion 44 still will overlap the wall of semi-cylindrical section 14 slightly to eliminate any chance of the shutter catching in the slot 41.

In operation, a combustible gas may be provided by some means such as a conventional valve 49 which may be connected to a source of gas, not shown, and includes a spud or orifice holder 50 positioned in communication with the gas inlet 32 of the burner. In the mixing chamber the gas is mixed with air which enters through the opening 39 and then the gas and air mixture passes through the outlet 33 into the venturi tube 30. From the venturi tube it passes through the laminar flow region 31 and then the rectangular outlet or nozzle 31a. The air and gas mixture then flows into the domed extension 26 and is spread into a thin sheet and may be ignited by a suitable igniter (not shown) to provide a thin sheet of flame.

While the mixing chamber and shutter have been shown as being cylindrical in shape this particular configuration is for illustrative purposes only. What is necessary is that they be of complementary form and be smoothly curved so that the shutter may be easily captured within the mixing chamber after burner assembly and easily moved relative to the air opening. Also it would be apparent that the opening 38 could be omitted and a shutter used which closes more or less of the opening 39 if a holding means were used which would engage the semi-cylindrical portion 14. However, the provision of the dual opening is desirable because it simplifies the holding means arrangement.

While the invention has been shown in but one form it will be obvious to those skilled in the art that the changes discussed above, as well as others may be incorporated therein without departing from the spirit of the invention.

What is claimed and desired to be secured by Letters Patent of the United States is:

1. A gas burner structure including a mixing chamber, an ignition region and a tube interconnecting the two;
    (a) said mixing chamber having a smoothly curved peripheral wall with an inlet at one end for gas and an outlet at the other end communicating with said tube;
    (b) said peripheral wall defining a circumferentially extending air opening therein and a slot at one end of said air opening of greater width than said air opening; and
    (c) a complementally formed shutter including a portion of greater width than said air opening, said shutter being insertable in said mixing chamber by passing said portion through said slot to bring said portion into at least partial register with said air opening thereby to control the effective size of said air opening.

2. A burner structure as set forth in claim 1 wherein said shutter is movable within said mixing chamber to vary the degree of register between said air opening and said portion, and including means for releasably holding said shutter in predetermined positions within said chamber.

3. A gas burner structure including a mixing chamber, an ignition region and a tube connecting the two;
    (a) said mixing chamber having a smoothly curved peripheral wall defining an inlet at one end for gas and an outlet at the other end communicating with said tube;
    (b) said peripheral wall having a first section defining a first, relatively narrow, circumferentially extending opening therein;
    (c) said peripheral wall having a second section defining a second, relatively wide, circumferentially extending opening therein and a slot of greater width than said second opening at one end of said second opening; and
    (d) a complementally shaped shutter including a first, relatively narrow portion and a second portion, wider than said second opening, and shutter being insertable within said mixing chamber through said second opening by passing said second portion through said slot thereby to bring said shutter in register with said openings.

4. A burner structure as set forth in claim 3 wherein said shutter effectively closes said first opening and said second portion of said shutter effectively closes any part of said second opening in register therewith; said shutter being movable within said chamber to vary the effective size of said second opening; and said structure including securing means engageable with said shutter through said first opening to releasably hold said shutter in predetermined positions within said chamber.

5. A burner structure as set forth in claim 4 wherein said openings are each substantially semi-circular and are formed in radially opposite sides of said peripheral wall; said shutter is ring like in form with each of said portions being substantially semi-circular in extent; said securing means engaging said shutter in the area of a juncture of said portions whereby said shutter may be adjusted between a postion with said second portion substantially fully in register with said second opening and a position with said second position substantially fully out of register with said second opening.

6. A gas burner structure comprising:
(a) pair of elements, each element having a semi-cylindrical section with a pair of end walls, a relatively long tapered groove of semi-circular cross sections with a small radius end connected to an end wall of said semi-cylindrical portion and opening into said sections, a planar flange extending outwardly from each side of each semi-cylindrical section and groove;
(b) said elements being disposed in abutting relation with said semi-cylindrical sections and tapered grooves aligned and said flanges joined together so that said semi-cylindrical sections form a generally cylindrical mixing chamber and said tapered grooves form a tube;
(c) one of said sections defining a first, relatively narrow, circumferentially disposed opening therein; the other of said sections defining a second, relatively narrow, circumferentially disposed opening therein and a slot of greater width than said second opening at one end of said second opening; said openings being in axial alignment when said elements are joined in said abutting relation; and
(d) a complementally shaped shutter including a first, relatively narrow portion and a second portion wider than said second opening, said shutter being insertable within said mixing chamber through said second opening by passing said second portion through said slot thereby to bring said shutter in register with said openings.

7. A burner structure as set forth in claim 6 wherein said shutter effectively closes said first opening and said second portion of said shutter effectively closes any part of said second opening in register therewith; said shutter being movable within said chamber to vary the effective size of said second opening; and said structure including securing means engageable with said shutter through said first opening to releasably hold said shutter in predetermined positions within said chamber.

References Cited

UNITED STATES PATENTS 2,638,976   5/1953   Vixler _____ 239—419.5
2,746,532   5/1956   Keating _____ 239—419.5

CHARLES J. MYHRE, *Primary Examiner.*

H. B. RAMEY, *Assistant Examiner.*

U.S. Cl. X.R.

137—625.31; 251—145, 345; 239—419.5